G. A. HUMASON.
LOCK NUT.
APPLICATION FILED APR. 26, 1910.

1,033,759.

Patented July 23, 1912.

Granville A. Humason, Inventor

Witnesses by C. A. Snow & Co., Attorneys

UNITED STATES PATENT OFFICE.

GRANVILLE A. HUMASON, OF SHREVEPORT, LOUISIANA.

LOCK-NUT.

1,033,759.  Specification of Letters Patent.  Patented July 23, 1912.

Application filed April 26, 1910. Serial No. 557,650.

*To all whom it may concern:*

Be it known that I, GRANVILLE A. HUMASON, a citizen of the United States, residing at Shreveport, in the parish of Caddo and State of Louisiana, have invented a new and useful Lock-Nut, of which the following is a specification.

It is the object of the present invention to provide an improved nut lock, and the invention relates more particularly to an improved construction of lock washer.

More specifically speaking, the lock washer of the present invention is of that type adapted to be disposed upon a bolt and to have portions bent into engagement with the nut to be locked upon the bolt and whereas, ordinarily, the portion of a washer of this type against which the nut bears, is flat and non-yielding, the said portion in the instance of the present invention is so constructed as to yield so that, whereas certain projecting portions of the washer are to be bent into engagement with the side faces of the nut to be locked, it is always possible to rotate the nut to bring certain of its side faces into proper position for the engagement therewith of the said overbent portions of the washer. Where the before mentioned portion of the washer is flat, however, the nut can be tightened only to a certain degree and further rotation is then rendered practically impossible, especially where such rotation must be to the extent of about a quarter of a turn.

Figure 1:
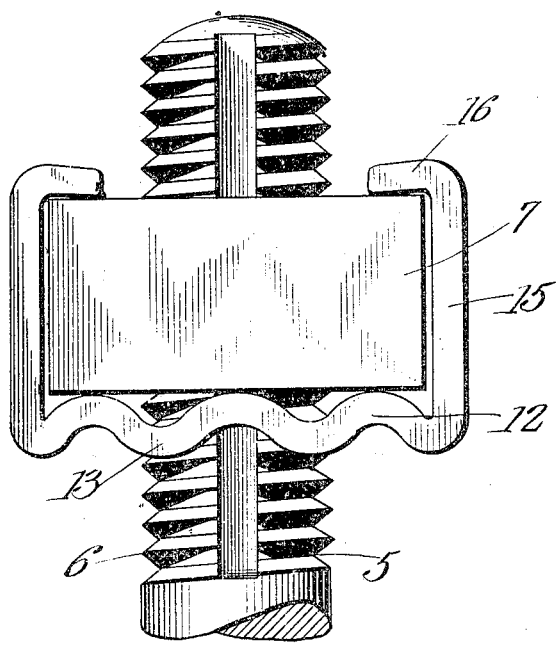
Figure 2:
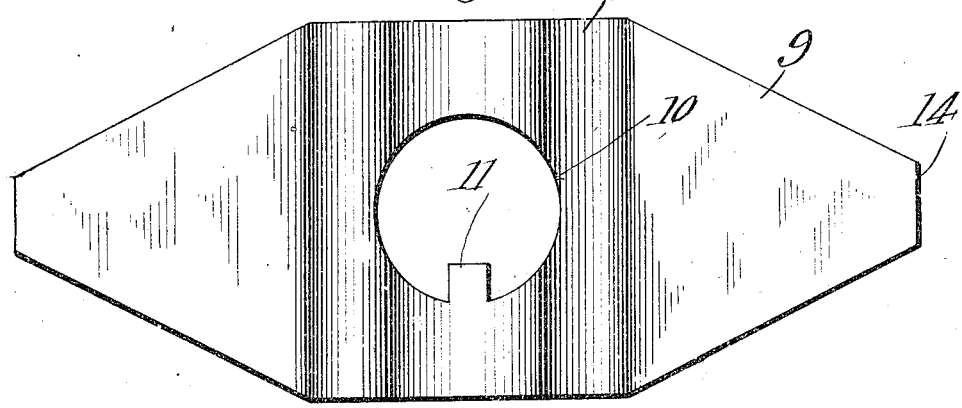

In the accompanying drawings,—Figure 1 is a top plan view of a portion of a bolt, a nut thereon, and the washer embodying the present invention. Fig. 2 is a plan view of the washer prior to its application to the bolt and nut.

In the drawings, there is shown a bolt 5 formed throughout its forward portion with a groove 6 and there is also illustrated in the drawings, a nut 7 which in this instance is rectangular and is threaded upon the said bolt 5.

The lock washer embodying the present invention is formed from a stout sheet metal blank, the intermediate or body portion of which is rectangular and is indicated in the drawings in general by the reference numeral 8, it being formed at opposite sides, with integral tongues which are indicated by the numeral 9 and these tongues are substantially V-shaped or in other words have their side edges converging in a direction away from the said body portion 8 of the washer, the tongues at their ends being not sharply pointed, but on the other hand being cut off on a line parallel to the respective side of the body 8 of the washer. The body 8 of the washer is formed centrally with a bolt-receiving opening which is indicated by the numeral 10 and with a lug 11 which projects into this opening and engages in the groove 6 in the bolt shank 5, as will be readily understood.

It will be observed from an inspection of the figures of the drawings that the said body of the washer is formed with corrugations 12 and 13 which alternate and are oppositely presented. These corrugations preferably extend from one to the other of the edges of the body portion of the washer other than the edges from which the tongues 9 project and are consequently parallel to the end edges 14 of the said tongues.

It will be observed from the drawings that in applying the washer to the bolt and nut, the washer is disposed upon the bolt with its lug 11 projecting into the groove 6 in the shank of the bolt and the nut 7 is then threaded upon the said shank of the bolt and against the corrugations 12, this threading of the nut upon the bolt being continued, and the washer being fed along the bolt shank by reason thereof, until the corrugations 13 of the washer come into contact against the member to be secured by the bolt and nut. Should the nut, when properly tightened, have two of its faces parallel to the edges of the body of the washer at which the corrugations terminate, the tongues 9 are bent out at right angles, as at 15, with their said portions bearing against the other opposite faces of the nut and their extremities are then bent inwardly toward each other, as at 16, upon the outer face of the nut, the nut being in this manner firmly locked upon the bolt. Should it happen, however, that after being properly applied upon the bolt, the corners of the nut are presented toward the edges of the body of the washer at which the corrugations terminate, the nut may then be further tightened upon the bolt until opposite faces are in the position first stated, it being understood that this further tightening of the nut will serve to flatten the corrugations 12 and 13 to a greater or less degree. It will also be readily understood that not only does the feature of forming the corrugations in the body of the washer permit of proper positioning of the nut prior to bending over the nut locking tongues of the washer, but also the resiliency possessed by the washer is exerted throughout its corrugated portion to hold the nut firm so that in warm weather expansion of the bolt will not result in a loosening of the parts which it is intended to secure, but on the other hand, the expansion of the corrugated body of the washer between the said part to be secured and the said nut will fill in this space and take up the said expansion of the bolt shank.

It will be noted that the lug 11 is extended parallel with the corrugations so that, when the corrugated portion of the washer is flattened, or partly flattened by the nut, there will be no danger of the lug being withdrawn from the groove 6 in the bolt shank, as would be the case should said lug be extended along lines intersecting the corrugations.

What is claimed is:

A lock washer comprising a resilient plate provided with three relatively deep transverse corrugations arranged in parallelism and having rounded channels and crests whereby to permit the corrugations to yield under pressure and thus secure a lateral sliding action accompanied by a spring resistance between the washer and the parts between which it is clamped, the intermediate corrugations being provided with a bolt opening formed with an inward projecting lug to engage a groove in a bolt, and the terminals of the plate being reduced in width to permit the outer walls of the terminal corrugation to define bending lines along which the reduced ends of the washer can be bent around the nut in conjunction with which it is used.

In testimony that I claim the foregoing as my own, I have hereto affixed my signature in the presence of two witnesses.

GRANVILLE A. HUMASON.

Witnesses:
J. ANDY CALDWELL,
J. A. DASTER.